July 21, 1959  C. S. FULLER ET AL  2,896,128
LIGHTNING SURGE PROTECTING APPARATUS
Filed March 5, 1954

INVENTORS: C. S. FULLER
G. L. PEARSON
BY
Arthur J. Torsiglieri
ATTORNEY

United States Patent Office 2,896,128
Patented July 21, 1959

2,896,128

LIGHTNING SURGE PROTECTING APPARATUS

Calvin S. Fuller, Chatham, and Gerald L. Pearson, Bernards Township, Somerset County, N.J., assignors to Bell Telephone Laboratories, Incorporated, New York, N.Y., a corporation of New York Application March 5, 1954, Serial No. 414,332

1 Claim. (Cl. 317—61)

This invention relates to high-voltage protection apparatus for use in a telephone system.

It is now customary in a telephone system to insert intermediate between a subscriber's substation set and the outdoor telephone transmission line which connects it to the local station, apparatus for protecting the set against high voltages which might prove damaging to it and dangerous to anyone using it. These high voltages comprise most importantly transients, the high voltage surges resulting when lightning strikes near the transmission line, or more prolonged high voltages which result when power lines which are strung adjacent to the transmission line are blown into contact therewith.

Accordingly, such protective apparatus is designed both to provide voltage regulation which ensures that any high voltage surges and transients on the line do not reach the set to any dangerous extent and additionally to include a fuse mechanism which protects the voltage regulating element against an extended interval of high voltages which might burn it out and make it possible for high voltages to reach the subscriber's set.

To provide the voltage regulation which protects against high voltage surges, it is the current practice to include in the protective apparatus carbon blocks which serve to bypass the high voltage surges to ground. Such carbon blocks include two carbon elements spaced apart by a short air gap. This air gap provides a high impedance to ground at the usual operating line voltage, but a voltage surge whose magnitude exceeds a predetermined level causes breakdown of the air gap between the carbon elements, after which event the impedance to ground of the carbon block falls sharply to a very low value, and the carbon block serves to bypass the high surge currents.

However, protective arrangements of this kind are proving expensive to maintain. The air gap between the pair of carbon elements is so narrow that the breakdown characteristics of the carbon block are very sensitive to dust and moisture which collect in the air gap. Moreover, discharges across the air gap result in deterioration of the smooth surfaces of the carbon elements and tend to dislodge carbon particles which collect in the air gap in an undesirable manner. It is conservatively estimated that the maintenance expense of protective apparatus of this kind, utilizing such carbon blocks, presently is in excess of a million dollars annually.

Accordingly, the primary object of the present invention is to reduce the cost of providing protection against high voltage surges in telephone lines.

A related object is to provide durable, dependable and economical high voltage protection in a telephone system.

A related object is to provide a novel form of voltage regulating element for use in a telephone transmission system.

A feature of the present invention is an appropriately designed p-n-p semiconductive silicon element which can be utilized in the protection apparatus in place of the carbon blocks to protect against high voltage surges.

Conduction occurs in electronic semiconductors by means of two types of charge carriers, electrons and holes. These carriers can be provided in the semiconductor in several ways including the application of sufficient energy to break an electron away from its semiconductive atom, thus creating an unbound electron and an unbound hole, and also including the presence of certain elements in the crystal structure which have either an excess or deficit of valence electrons. Generically, those semiconductors wherein conduction in the main is by electrons are called n-type, while those wherein conduction occurs by holes are called p-type. The conductivity transition regions between zones of opposite conductivity type in a semiconductive body are known as p-n junctions.

The silicon element which forms a feature of the invention comprises a low-resistivity n-type zone intermediate between p-type zones of low resistivity including boron as the significant p-type impurity. Low resistance ohmic connections are made to each of these p-type zones, to one of which is connected one of the two conductors extending between the transmission line and the subscriber's set and to the other of which is made a suitable ground connection. The various advantages of such a design are set forth hereinafter.

Another feature of the invention is the combination of such a silicon element with a fuse arrangement for protecting the silicon element against steady high voltages of the kind which result when a power line remains in intimate contact with the telephone line and which would burn out the element leaving the subscriber's set vulnerable to high voltages.

The invention will be better understood from the following more detailed description taken in conjunction with the accompanying drawings in which.

Figure 1:
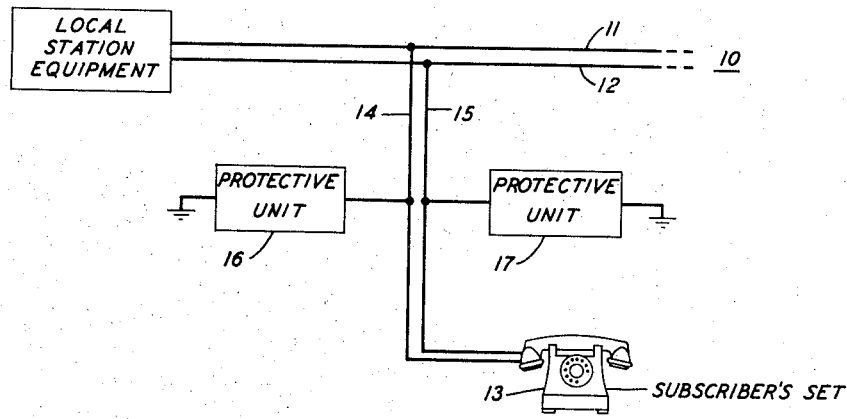
Fig. 1 illustrates schematically the usual manner in which a subscriber's substation set is protected from high voltages on the transmission line which connects the set to the local telephone station.

In Fig. 1 the two conductors 11 and 12 form a telephone transmission line which connects the various subscribers to a central telephone office. Each subscriber served by this telephone line has his home substation set 13 connected thereto by a drop comprising the two conductors 14 and 15. As discussed above, it is the general practice to include protective apparatus along the drop to guard the substation set from any dangerously high voltages which appear on the transmission line. It is usually important to protect both conductors 14 and 15 from high voltages of either polarity since protection must be provided against any eventuality which may result in high voltages on the subscriber's equipment dangerous to a user. To provide a bypass to ground from each of the two conductors 14 and 15 for any such dangerously high voltages, protective units 16 and 17 are connected serially between conductors 14 and 15, respectively, and a region of ground potential, which in the typical case is provided by a water pipe.

Each protective unit preferably includes both an element for protecting against high voltage surges and an element for protecting this element against prolonged high voltages. Fig. 3 shows a protective unit 30 of this kind in accordance with the invention. It includes both a silicon element 20 which normally provides a high impedance between the transmission line and ground but acts as a low impedance when the transmission line potential exceeds the ground potential by more than a predetermined value, and also a fuse mechanism which after a prolonged interval of abnormally high currents through the silicon element serves to introduce a still lower impedance of its own between the line and the ground, effectively shorting out the silicon element. However, before describing the protective unit as a whole, it will be advantageous to discuss more specifically the nature of the silicon element, shown in detail in Fig. 2, which forms an important feature thereof.

The silicon element 20 is a semiconductive body having a pair of p-n junctions, back to back, to form a p-n-p structure. As described above, a p-n or n-p junction is an integral body of semiconductive material having two contiguous body portions of opposite conductivity type (one of p-type material, the other of n-type) with a thin "transition" layer of material at the interface. Such a junction is described as biased in the forward direction when by suitable ohmic connections a positive potential is applied to the p-type zone and as biased in the reverse direction when a negative potential is applied to the n-type zone. Such a junction normally affords a high resistance to current flow in a reverse direction, but, as is described more fully in copending application Serial No. 211,212, filed on February 16, 1951, now Patent No. 2,714,702, by W. Shockley, if a reverse voltage applied to a p-n junction is increased to sufficiently large values, a critical breakdown voltage is encountered at which the resistance of the junction is very low. Moreover, beyond this breakdown voltage the current increases sharply with any further slight increase in voltage whereby the junction serves effectively as a voltage regulator. The voltage at which the junction breaks down, as well as the resistance after breakdown, can be controlled by the net impurity concentration gradient in the transition layer.

By utilizing two p-n junctions back-to-back in an integral body in the manner shown, it is ensured that the element will afford a high resistance to voltages of either sign whose magnitude is less than that of the critical breakdown voltage, and a low resistance to voltages of either sign whose magnitude exceeds that of the critical breakdown voltage. Such an integration into a single body, although not essential, provides advantages of simplicity and compactness.

For the special application contemplated here, rather severe requirements are imposed on an element of this kind. It is desirable that the element exhibit a resistance of at least 100,000 ohms to voltages which are less than a breakdown voltage of approximately 175 volts and after breakdown to be able to pass up to 5,000 amperes for short intervals with a voltage drop thereacross of less than 500 volts, this corresponding to a resistance of a fraction of an ohm. It is also important that the element be stable and rugged, and reliability is of paramount importance.

Various forms of semiconductive bodies were tested before a design was discovered which best met the many requirements. The optimum design forms an important specific feature of the present invention.

Figure 2:
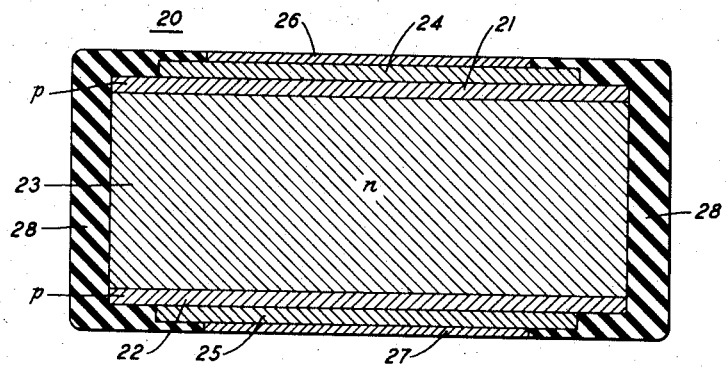
Fig. 2 shows in cross section and on an enlarged scale a silicon voltage regulating element which forms an important feature of a protective unit in accordance with the invention.
Figure 3:
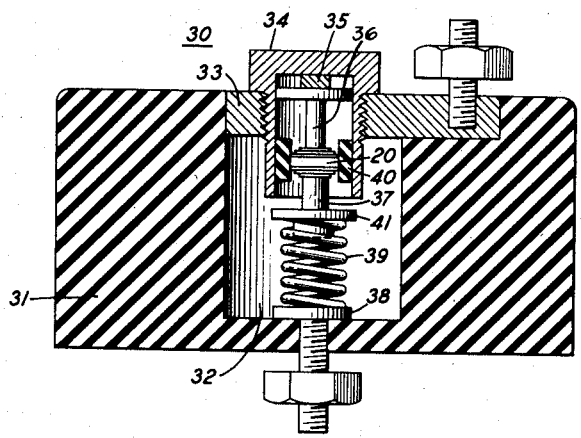
Fig. 3 shows in cross section a protective unit in accordance with the invention and incorporating a voltage regulating element of the kind shown in Fig. 2.

It is in accordance with this feature of the present invention to realize the desired characteristics in an integral silicon body of the kind shown in Fig. 2 which has two terminal zones 21, 22 of p-type conductivity resulting from a predominance of boron impurities and an intermediate zone 23 of n-type conductivity.

In a specific illustrative embodiment which has a circular configuration of 5/8" diameter, each of the p-type layers 21, 22 has a resistivity of about 0.001 ohm centimeter and a thickness of about 1.5 mils and the n-type zone 23 a resistivity of about 3.0 ohm centimeters and a thickness of about 30 mils. Such an element has a resistance to voltages below the breakdown at about 200 volts of several megohms, and after breakdown is able to pass for microseconds current of 5,000 amperes with a voltage thereacross of about 325 volts. Alternatively, by utilizing an n-type zone of about 0.3 ohm centimeter a breakdown at about 100 volts may be achieved.

A design of this kind has many advantages. The choice of silicon as the semiconductive body material makes it possible to realize readily a high resistance to current flow in the reverse direction before breakdown. Silicon exhibits after breakdown a particularly flat voltage current characteristic. Additionally, silicon is especially insensitive to temperature changes, and so is able to dissipate relatively large amounts of power with no ill effects. The choice of boron as the impurity controlling the conductivity type of the terminal layer not only makes possible extremely low resistance after breakdown but also facilitates making low resistance terminal connections.

Typically, boron-diffused p-type layers can be formed on an n-type body by the diffusion technique described in copending application Serial No. 414,272, filed March 5, 1954, by C. S. Fuller in which a silicon wafer of n-type conductivity of the value desired is heated at a temperature of 1250° centigrade in an atmosphere of boron trichloride at a half an atmosphere of pressure for 17 hours. The p-type layer is formed over the complete surface and, thereafter, the edges are ground to form a p-n-p structure.

It is also important to ensure good ohmic connections to the p-type layers 21, 22. For this purpose, it is advantageous to plate the p-type layers with metallic coatings 24, 25. It is important to choose a material which will not contaminate the p-type zone. Rhodium, for example, is suitable for this purpose. It is the greater facility with which a metallic coating can be electroplated to a boron-diffused p-type layer to form a low resistance connection that is one factor that makes this design superior to possible alternatives, for example, an integral silicon body having an intermediate zone of p-type conductivity and phosphorous-diffused n-type layers. It is advantageous to keep the edges of the p-type layers unplated to minimize the tendency to arc. Moreover, since in the specific unit in which this silicon element is to be incorporated a pressure contact rather than a solder joint is made to coatings 24, 25, it is advantageous to superimpose coatings 26, 27 of a soft metal, such as tin, with which a low-resistance pressure contact can be made conveniently. Since it is desirable to avoid having the tin coating in direct contact with the p-type layers, the edges of the rhodium coatings are kept free of the tin. It is also important to minimize the tendency for arcing between the two p-type layers. For this purpose, it is advantageous to provide a lacquer coating 28 around the edges of the p-type layers and rhodium coating to increase the gap resistance between the two p-type layers. Also such a lacquer coating advantageously serves to seal the element from moisture.

Returning now to the complete unit 30 shown in Fig. 3, the various elements are enclosed in an insulating housing 31 which can be a block of ceramic material and which includes a cylindrical recess 32. A portion of the side wall of this recess supports a brass ring 33 into which is threaded a hollow brass screw 34. Within the hollow of the brass screw, there is positioned a lead pellet 35 which extends between the head portion of screw 34 and the top surface of the brass platform member 36. The lower end of member 36 rests upon the upper surface of the voltage regulating element 20 described in connection with Fig. 2. The element 20 is supported on a brass platform member 37 which in turn is supported on a brass terminal 38 at the bottom of the recess 32 by way of a cadmium bronze spring 39 which is normally under tension. The element 20 is insulated from the inner wall of screw 34 by a ceramic spacer 40. The platform member 37 is provided with a flange portion 41 which is normally spaced from the bottom end of the screw 34. The ring 33 is connected to one of the conductors forming the drop from the telephone line and the terminal 38 is connected to ground.

Under the usual conditions, the only current path from the ring 33 to the terminal 38 is by way of the element 20. However, after a sufficiently long interval of excessive current flow through the element 20, resulting from line voltages in excess of the breakdown voltage, the lead pellet 35 will melt as a result of overheating, tending to permit a spacing between the top level of the melted lead and the head portion of screw 34. However, the spring 39 being under tension expands to take up any slack, thereby raising the platform member 37 to the point where its flange portion 41 makes firm electrical contact with the bottom end of the screw 34. There then results between the ring 33 and the terminal 38 a new current path, which has a resistance sufficiently low compared to that of the element 20 effectively to short it. Accordingly, the protective unit thereafter acts as a short between the line and ground, disabling the subscriber's substation set until such time as the protective unit is replaced.

What is claimed is:

Means for preventing voltage surges on a telephone transmission line from reaching a subscriber's substation set comprising a pair of PNP silicon diodes each connected between a conductor of said transmission line and ground, a pair of fuse elements each serially connected with a different one of said diodes, and means under control of each fuse element for short circuiting its related diode, whereby voltage surges of either polarity in said transmission line are conducted to ground.

References Cited in the file of this patent

UNITED STATES PATENTS

| | | |
|---|---|---|
| 1,745,690 | Pritchett | Feb. 4, 1930 |
| 2,619,518 | Kelsay | Nov. 25, 1952 |
| 2,655,625 | Burton | Oct. 13, 1953 |
| 2,669,635 | Pfann | Feb. 16, 1954 |
| 2,672,528 | Shockley | Mar. 16, 1954 |
| 2,680,220 | Starr | June 1, 1954 |
| 2,714,702 | Shockley | Aug. 2, 1955 |

FOREIGN PATENTS

| | | |
|---|---|---|
| 551,443 | Great Britain | Feb. 25, 1943 |
| 643,646 | Great Britain | Sept. 27, 1950 |